United States Patent [19]
Roytberg et al.

[11] Patent Number: 6,164,885
[45] Date of Patent: Dec. 26, 2000

[54] INSERT FASTENER

[75] Inventors: Leonid Roytberg, Brookline; Howard N. Wieland, Holliston, both of Mass.

[73] Assignee: American Engineered Components, Inc., Brighton, Mass.

[21] Appl. No.: 09/449,805

[22] Filed: Nov. 26, 1999

[51] Int. Cl.$^7$ ............................. F16B 13/06; F16B 37/04
[52] U.S. Cl. ............................. 411/61; 411/55; 411/60.2; 411/173; 411/182
[58] Field of Search ............................. 411/55, 60.2, 61, 411/173–175, 182, 508, 509

[56] References Cited

U.S. PATENT DOCUMENTS

| | | | |
|---|---|---|---|
| 2,208,779 | 7/1940 | Tinnerman | 411/61 |
| 2,567,884 | 9/1951 | Heath | 411/61 |
| 2,788,047 | 4/1957 | Kapata | 411/182 |
| 3,645,311 | 2/1972 | Tinnerman | 411/173 |
| 5,593,263 | 1/1997 | Clinch et al. | |
| 5,873,690 | 2/1999 | Danby et al. | |

*Primary Examiner*—Neill Wilson
*Attorney, Agent, or Firm*—Kriegsman & Kriegsman

[57] ABSTRACT

A one-piece insert fastener adapted for securement within an aperture in a panel by a threaded member. The insert fastener includes a base having a top surface, a bottom surface, a pair of outwardly protruding wings and a single-threaded, helical edge which is shaped to define a opening. The insert fastener also includes a pair of resilient, spaced apart legs which are formed on and protrude out from the base. Each of the pair of legs includes an outwardly angled upper section, an inwardly angled middle section and a lower section. In use, the insert fastener is disposed into the aperture in the panel until the pair of wings abuts against the outer surface of the panel. The threaded member is rotatably driven into the opening in the base and is engaged by the helical edge. Continued rotational driving of the threaded member causes the threaded member to contact and outwardly urge the pair of spaced apart legs into contacting engagement with the inner surface of the panel, thereby securing the insert fastener onto the panel. Insertion of the above fastener into a panel requires less than ten pounds of force. Once inserted, the fastener is secure until final assembly.

8 Claims, 2 Drawing Sheets

INSERT FASTENER

BACKGROUND OF THE INVENTION

The present invention relates generally to fasteners and more particularly to insert fasteners adapted for securement within an opening in a panel by a threaded member.

Insert fasteners are well known in the art and are commonly used in the automotive industry to secure objects, such as interior trim, onto a panel, such as an automotive body panel.

Insert fasteners are used to secure interior and exterior trim onto an automotive panel in the following manner. Specifically, the insert fastener is typically pushed into a square-shaped opening which is punched, molded or formed in an automotive panel, the body panel being typically manufactured out of a soft sheet metal or plastic. With the insert fastener disposed within the opening, the interior trim is positioned against the automotive body panel. A threaded member, such as a screw, is then driven through the interior trim and into threaded engagement with the insert fastener, thereby securing the trim onto the automotive body panel. In the automotive manufacturing process, the threaded member is commonly driven through the trim and into the insert fastener using automatic screw driving devices which have torque levels of approximately 5 Newton-meters.

One type of insert fastener which is well known in the art is the snap-in insert fastener.

Snap-in insert fasteners, also commonly referred to as snap-in fasteners, typically comprise one or more resilient fingers which are adapted to flatten as the fingers are pressed into the aperture in the automotive body panel. Once the fingers pass through the aperture and onto the opposite side of the body panel, the fingers outwardly snap back to their original configuration to lockingly secure the fastener onto the automotive body panel.

Snap-in fasteners of the type described above are often constructed out of a solid, molded plastic which includes a central bore therethrough. In use, self-threading screws are typically driven in the central bore and into threaded engagement with the fastener.

As an example of a snap-in fastener, in U.S. Pat. No. 5,593,263 to J. P. Clinch et al, there is disclosed a snap-in fastener that is adapted to having an object such as automobile trim secured thereto by a threaded member such as a screw. The snap-in fastener features a pair of opposed resilient fingers having a contoured cross-section which enable them to flatten as they are pressed into an aperture in a panel. The fingers flatten as they are pressed into the panel aperture until free-ends of tabs extending therefrom spring or snaps outwardly to engage the opposite side of the panel to lockingly secure the fastener and the trim to the panel while enabling the fingers to resume their original contoured cross-sectional configuration.

Although well known and widely used in commerce, snap-in insert fasteners experience some notable drawbacks.

As a first drawback, snap-in insert fasteners require an extremely high level of force in order to remove the fastener from the panel. Consequently, snap-in insert fasteners are effectively incapable of being backed out of the opening in the panel without destroying the shape of the aperture in the panel. Because snap-in fasteners can not be backed out of the aperture in the body panel, the fasteners are rendered incapable of reuse or replacement. This is particularly significant with regards to snap-in fasteners that are constructed of plastic. Specifically, it has been found that automatic screw driving guns, which are routinely used on the assembly lines of automobile manufacturers, drive the threaded member into the fastener at such a high torque (approximately 5 Newton-meters) that the plastic fastener becomes stripped as the threaded member is driven through the central bore. As a result, the stripped plastic fastener is unable to hold the screw, thereby rendering the plastic fastener useless. Because the stripped plastic fastener is incapable of being backed out of the door panel, the fastener has to be knocked into and through the door panel aperture in order to remove the stripped plastic fastener. By knocking the plastic fastener into the door panel, the insert is irretrievably lost within the door panel interior. Positioned free within the door panel interior, the insert tends to bounce around and rattle within the door panel, thereby creating unwanted noise.

As a second drawback, it has been found that the tight, snap-fit securement of snap-in insert fasteners within an associated opening in the body panel limits the range of potential applications in which the fastener can be used. In particular, the snap-fit mechanics of a snap-in insert fastener allows for the fastener to be used only in conjunction with body panels having apertures of limited sizes and in conjunction with body panels of limited thicknesses.

As a third drawback, it has been found that snap-in insert fasteners require a relatively high insertion force (approximately 10 pounds) in order to push the fastener into the opening in the automotive body panel. As a result, the entire manufacturing process of securing the interior trim onto the body panel is rendered more difficult and time consuming.

Another type of insert fastener which is well known in the art is the expansion insert fastener.

Expansion insert fasteners, also commonly referred to as expansion fasteners, typically comprise a pair of resilient legs and a central bore which is adapted to receive a threaded member. With the expansion fastener pressed into an aperture in an automotive body panel, the threaded member is driven into the bore of the expansion fastener until the threaded member spreads the pair of resilient legs apart and into engagement against the automotive body panel, thereby securing the fastener within the opening in the panel.

As an example of an expansion fastener, in U.S. Pat. No. 5,873,690 to M. R. Danby et al, there is disclosed a thread nut expansion fastener for securement within an opening to a panel by a threaded member. When the threaded member is rotationally advanced through a barrel nut, the threaded member causes the free-ends of resilient legs to move away from each other and engage and urge resilient fingers into contacting engagement with opposite sides of the opening with sufficient force to secure the fastener to the panel.

Although well known and widely used in commerce, expansion fasteners experience some notable drawbacks. For example, it has been found that the complex bending arrangement of the legs of expansion fasteners renders the manufacturing of expansion fasteners a relatively complicated and expensive process.

SUMMARY OF THE INVENTION

It is an object of the present invention to provide a new and improved insert fastener.

It is another object of the present invention to provide an insert fastener which is adapted for securement within an aperture in a panel by a threaded member.

It is yet another object of the present invention to provide an insert fastener as described above which is adapted to securely engage a threaded member driven therethrough at a high torque level.

It is still another object of the present invention to provide an insert fastener as described above which can be inserted into the aperture in the panel using a relatively low insertion force.

It is another object of the present invention to provide an insert fastener as described above which can be backed out of the aperture of the panel using a relatively low removal force.

It is yet another object of the present invention to provide an insert fastener as described above which can be easily reused and/or replaced.

It is still another object of the present invention to provide an insert fastener as described above which can be used in a wide range of applications, such as in apertures of varying length and width and in panels of varying thickness.

It is another object of the present invention to provide an insert fastener as described above which can be securely retained in a tight relationship within the aperture in the panel.

It is yet another object of the present invention to provide an insert fastener as described above which has a limited number of parts, which is easy to use and which is inexpensive to manufacture.

Accordingly, there is provided an insert fastener adapted for securement within an aperture in a panel by a threaded member, said insert fastener comprising a base having a top surface, a bottom surface, a pair of wings and a helical edge shaped to define a opening, the opening being sized and shaped to receive the threaded member, the helical edge being adapted to engage the threaded member, and a pair of spaced apart legs for securing said insert fastener onto the panel, said legs being formed on and protruding out from the bottom surface of said base, each of said legs comprising an upper section, a middle section angled relative to the upper section about a first bend and a lower section angled relative to the middle section about a second bend, wherein said legs are adapted to contact the threaded member in such a manner so that the threaded member outwardly urges said legs into contacting engagement with the panel.

Various other features and advantages will appear from the description to follow. In the description, reference is made to the accompanying drawings which form a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
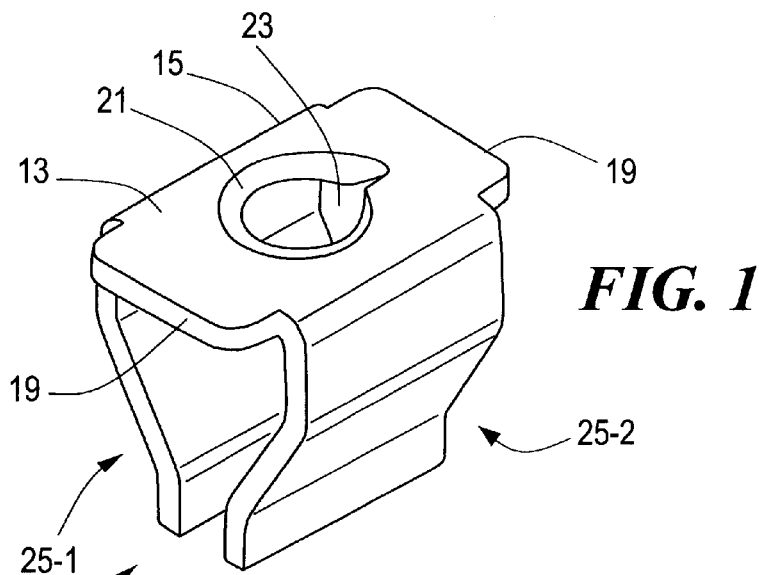
FIG. 1 is a top perspective view of an insert fastener constructed according to the teachings of the present invention.
Figure 2:
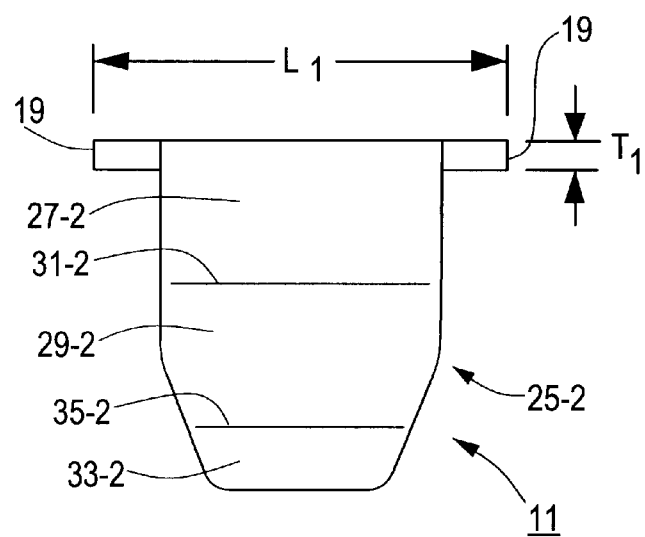
FIG. 2 is a side view of the insert fastener shown in FIG. 1.
Figure 3:
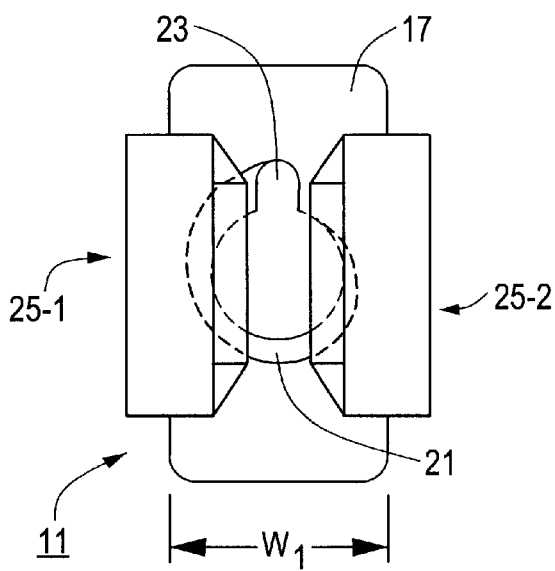
FIG. 3 is a bottom view of the insert fastener shown in FIG. 1.

Referring now to FIGS. 1–5, there is shown an insert fastener constructed in accordance with the principles of the present invention, the insert fastener being identified by reference numeral 11. As will be described further in detail below, insert fastener 11 can be used to secure an object, such as trim T, onto a panel, such as a vehicular body panel P, using an externally threaded member, such as a screw S.

Figure 4:
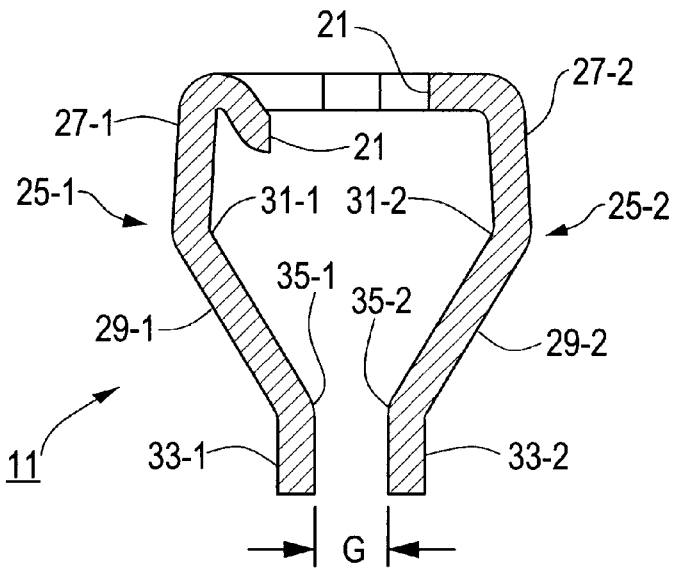
FIG. 4 is central cross-section view of the insert fastener shown in FIG. 1.

Insert fastener 11 is a unitary device which is preferably constructed out of a resilient and durable material, such as a high carbon steel or a heat-treated spring steel. Insert fastener 11 is generally U-shaped in lateral cross-section, as shown in FIG. 4, and is capable of easy insertion into and removal from an aperture A in panel P, as will be described in further detail below.

Insert fastener 11 comprises a base 13 having a top surface 15, a bottom surface 17 and a pair of outwardly protruding wings 19. Base 13 preferably has a length $L_1$ of approximately 10.00 mm, a width $W_1$ of approximately 5.20 mm and a thickness $T_1$ of approximately 0.71 mm.

Base 13 additionally comprises a single-threaded, helical edge 21 which is shaped to define a central opening 23. Helical edge 21 is preferably approximately 4.2 mm in diameter and approximately 1.4 mm in pitch and is adapted to engage an associated 4.2×1.41 metric self-tapping screw S which is threadingly disposed through opening 23 during use.

Although insert fastener 11 is shown comprising single-threaded, helical edge 21, insert fastener 11 could alternatively be manufactured to comprise a multi-threaded barrel nut, or other types of similar threaded engagement means, without departing from the spirit of the present invention. However, it should be noted that single-threaded helical edge 21 is preferable because edge 21 is considerably easier to manufacture and requires less material than a multi-threaded barrel nut.

Insert fastener 11 further comprises first and second legs 25-1 and 25-2 which are formed on and protrude out from base 13 in a spaced apart relationship, as shown in FIG. 4. Legs 25 are one-piece members which are integrally formed onto base 13 to make insert fastener 11 a unitary device. As will be described further in detail below, legs 25 serve to secure insert fastener 11 onto panel P.

First leg 25-1 comprises an upper section 27-1 which is integrally formed onto base 13. Similarly, second leg 25-2 comprises an upper section 27-2 which is integrally formed onto base 13. Upper sections 27-1 and 27-2 project out from base 13 at a prescribed angle away from bottom surface 17 so as to protrude outwardly away from each other. As will be described further in detail below, upper sections 27 serve as the contact and engagement surface for securing insert fastener 11 onto panel P.

First leg 25-1 also comprises a middle section 29-1 which is integrally formed onto upper section 27-1, middle section 29-1 being angled relative to upper section 27-1 about a first bend 31-1. Similarly, second leg 25-2 also comprises a middle section 29-2 which is integrally formed onto upper section 27-2, middle section 29-2 being angled relative to upper section 27-2 about a first bend 31-2. First bends 31-1 and 31-2 serve to project middle sections 29-1 and 29-2, respectively, inwardly towards each other.

First leg 25-1 further comprises a lower section 33-1 which is integrally formed onto middle section 29-1, lower section 33-1 being angled relative to middle section 29-1 about a second bend 35-1. Similarly, second leg 25-2 further comprises a lower section 33-2 which is integrally formed onto middle section 29-2, lower section 33-2 being angled relative to middle section 29-2 about a second bend 35-2. Second bends 35-1 and 35-2 serve to project lower sections 33-1 and 33-2, respectively, in a substantially parallel relationship with lower sections 33-1 and 33-2 spaced apart a gap setting G.

In use, insert fastener 11 can be used in the following manner to secure an object, such as trim T, onto a panel, such as vehicular body panel P, using an externally threaded member, such as screw S. Insert fastener 11 is pushed into an aperture A which is pre-formed in vehicular body panel P during typical automotive manufacturing. Insert fastener 11 is disposed into aperture A until outwardly protruding wings 19 abut against the outer surface of panel P. As such, wings 19 effectively prevent fastener 11 from being pushed all the way through aperture A.

It should be noted that the capability of legs 25 to be compressed considerably inward and the narrow lead-in configuration of lower sections 33 enable insert fastener 11 to be disposed within apertures of varying sizes, which is highly desirable. It should also be noted that the capability of legs 25 to be compressed considerably inward and the narrow lead-in configuration of lower sections 33 also enable insert fastener 11 to be snap-fit within aperture A using a relatively low insertion force, which is also highly desirable. In addition, it should further be noted that capability of legs 25 to be compressed considerably inward and the narrow lead-in configuration of lower sections 33 further enable insert fastener 11 to be backed out of aperture A using a relatively low removal force. As a result, fastener 11 is capable of replacement and/or reuse, which is highly desirable.

With insert fastener 11 disposed within aperture A, the outwardly angled disposition of upper sections 27 of legs 25 sufficiently contacts the inner surface of panel P to prevent inadvertent or casual removal of fastener 11 within aperture A. It should be noted that the length and angle of upper sections 27 enable fastener 11 to be disposed within panels P having varying thicknesses and/or burrs.

With insert fastener 11 properly disposed within aperture A, trim T is positioned against panel P. Screw S is then driven through trim T and into threaded engagement with single-threaded helical edge 21 of fasteners 11. It should be noted that the configuration of helical edge 21 enables insert fastener 11 to adequately engage screw S to prevent easy withdrawal of screw S from fastener 11. It should also be noted that the particular configuration and construction of helical edge 21 enables fastener 11 to properly engage a screw S driven thereinto at relatively high torque levels (approximately 5 Newton-meters) without stripping fastener 11, which is highly desirable.

Figure 5:
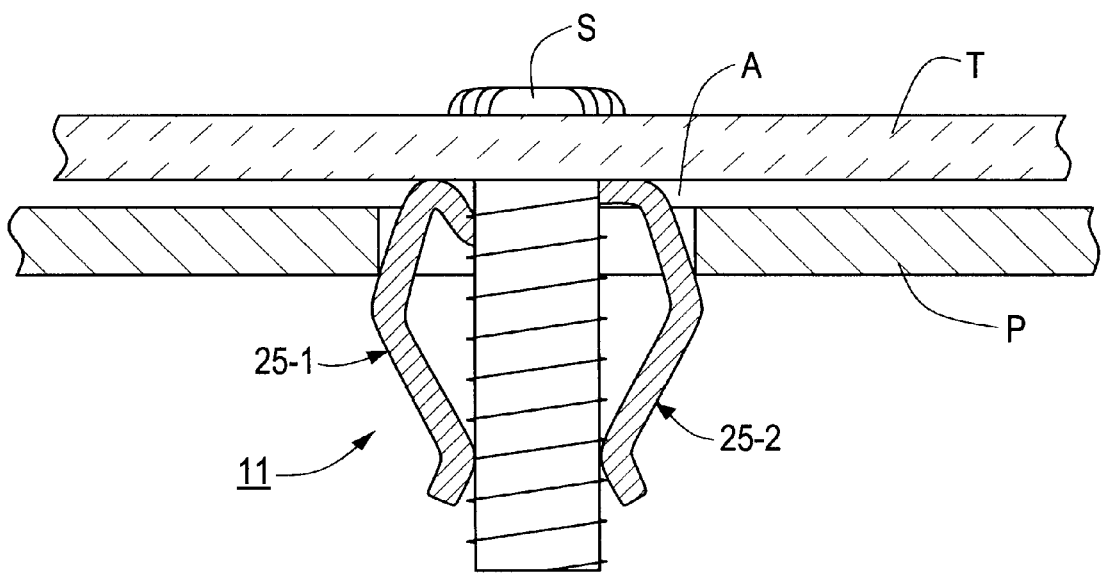
FIG. 5 is a central cross-section view of the insert fastener shown in FIG. 1, the insert fastener being shown securing a trim to a panel by a threaded member, the threaded member being shown in plan view.

Rotationally driving screw S into threaded engagement with helical edge 21 ultimately causes screw S to contact legs 25 proximate second bend 35, as shown in FIG. 5. It should be noted that the narrowly-spaced disposition of lower sections 33 serves to guide screw S straight down between legs 25. Continued rotation of screw S into fastener 11 causes screw 11 to outwardly urge legs 25 in such a manner that upper legs 27 are drawn into contacting engagement with panel P, thereby tightly securing insert fastener 11 and trim T onto panel P.

The embodiment shown of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An insert fastener adapted for securement within an aperture in a panel by a threaded member, said insert fastener comprising:

(a). a base having a top surface, a bottom surface, a pair of wings and a helical edge shaped to define an opening, the opening being sized and shaped to receive the threaded member and the helical edge being adapted to engage the threaded member, and (b). a pair of spaced apart legs for securing said insert fastener onto the panel, said legs being formed on and protruding out from said base, each of said legs comprising an upper section, a middle section angled relative to the upper section about a first bend and a lower section angled relative to the middle section about a second bend, the upper sections of said legs projecting angularly out from said base so as to protrude outwardly away from each other, (c). wherein said legs are adapted to contact the threaded member in such a manner so that the threaded member outwardly urges said legs into contacting engagement with the panel.

2. The insert fastener of claim 1 wherein said insert fastener is a unitary device.

3. The insert fastener of claim 2 wherein the middle sections of said pair of spaced apart legs are angled relative to the upper sections so as to protrude inwardly towards each other.

4. The insert fastener of claim 3 wherein the lower sections of said pair of spaced apart legs are disposed in a substantially parallel relationship.

5. The insert fastener of claim 4 wherein the helical edge in said base is single threaded.

6. An insert fastener adapted for securement within an aperture in a panel by a threaded member, said insert fastener comprising:

(a). a base having a top surface, a bottom surface, at least one wing and an opening which is sized and shaped to receive the threaded member, said base being adapted to engage the threaded member, and (b). a pair of legs for securing said insert fastener onto the panel, said legs being formed on and protruding out from said base, each of said legs comprising an upper section and a middle section angled relative to the upper section about a first bend, the upper sections of said legs projecting angularly out from said base so as to protrude outwardly away from each other, (c). wherein said legs are adapted to contact the threaded member in such a manner so that the threaded member outwardly urges said legs into contacting engagement with the panel.

7. The insert fastener of claim 6 wherein said insert fastener is a unitary device.

8. The insert fastener of claim 7 wherein the middle sections of said pair of legs are angled relative to the upper sections so as to protrude inwardly towards each other.

* * * * *